United States Patent
Saito et al.

(10) Patent No.: US 7,350,713 B2
(45) Date of Patent: Apr. 1, 2008

(54) MOBILE RADIO TERMINAL APPARATUS

(75) Inventors: Akinori Saito, Ome (JP); Toshihiro Ueno, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 195 days.

(21) Appl. No.: 11/241,306

(22) Filed: Sep. 30, 2005

(65) Prior Publication Data

US 2006/0258389 A1 Nov. 16, 2006

(30) Foreign Application Priority Data

May 16, 2005 (JP) ............................. 2005-142853

(51) Int. Cl.
*G06K 7/10* (2006.01)

(52) U.S. Cl. ................. 235/472.01; 235/494; 455/410; 455/411; 713/183

(58) Field of Classification Search ..... 235/380–382.5, 235/472.01–472.02, 494; 455/410, 411; 713/183; 716/5; 380/252–254
See application file for complete search history.

(56) References Cited

U.S. PATENT DOCUMENTS 6,219,410 B1 * 4/2001 Sun ............................. 379/156

FOREIGN PATENT DOCUMENTS

JP 2004-038403 A 2/2004

* cited by examiner

*Primary Examiner*—Michael G. Lee
*Assistant Examiner*—Kristy A. Haupt
(74) *Attorney, Agent, or Firm*—Frishauf, Holtz, Goodman & Chick, P.C.

(57) ABSTRACT

When power is turned on, control unit requests a user to enter a security code on the basis of information of SIM card inserted into a card I/F. If the security code entered by the user is an authorized code, the control unit permits the user to use the apparatus such that the apparatus can be utilized. In addition, the control unit urges a display unit to display a security code entered through operation unit, as hidden letters, and to display a control command such that the control command can be visually recognized.

4 Claims, 10 Drawing Sheets

MOBILE RADIO TERMINAL APPARATUS

CROSS-REFERENCE TO RELATED APPLICATIONS

This application is based upon and claims the benefit of priority from prior Japanese Patent Application No. 2005-142853, filed May 16, 2005, the entire contents of which are incorporated herein by reference.

BACKGROUND OF THE INVENTION

1. Field of the Invention

This invention relates to a mobile radio terminal apparatus capable of hidden letter display in entering information such as PIN code which needs to be concealed.

2. Description of the Related Art

In a conventional mobile radio terminal apparatus, when security code information such as PIN code is entered, the entered letters are displayed as hidden letters. Thus, even if a display unit is peeped from the surroundings, leakage of the security code information can be prevented.

Incidentally, when a mobile radio terminal apparatus in a state of accepting entry of the security code information accepts entry of the security code information, the entered numbers are not displayed as they are, but displayed as hidden letters (for example, Jpn. Pat. Appln. KOKAI Publication No. 2004-038403).

In a conventional mobile radio terminal apparatus, in a state of accepting entry of the security code information, if entry of a command to control a terminal such as USSD (Unstructured Supplementary Service Data) and the like is accepted besides entry of the security code information, both the information items are considered to be displayed as hidden letters for the purpose of preventing the leakage of the security code information. In this display processing, however, the user cannot recognize the entered information.

BRIEF SUMMARY OF THE INVENTION

The present invention has been accomplished to solve the above-described problems. The object of the present invention is to provide a mobile radio terminal apparatus wherein if information items other than security code information are entered in a state of accepting entry of the security code information, the user can recognize the entered information items.

To achieve this object, an aspect of the present invention is a mobile radio terminal apparatus comprising, display unit configured to display at least text information, entry unit configured to accept entry of a letter, and display control unit configured to control the display unit to display a letter being different from the letter accepted by the entry unit, wherein if a letter preset by the entry unit is entered, the display control unit controls the display unit to display the letter accepted by the entry unit.

According to an aspect of the present invention, if information items other than security code information are entered in a state of accepting entry of the security code information, the user can recognize the entered information items.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be explained below with reference to the accompanying drawings.

Figure 1:
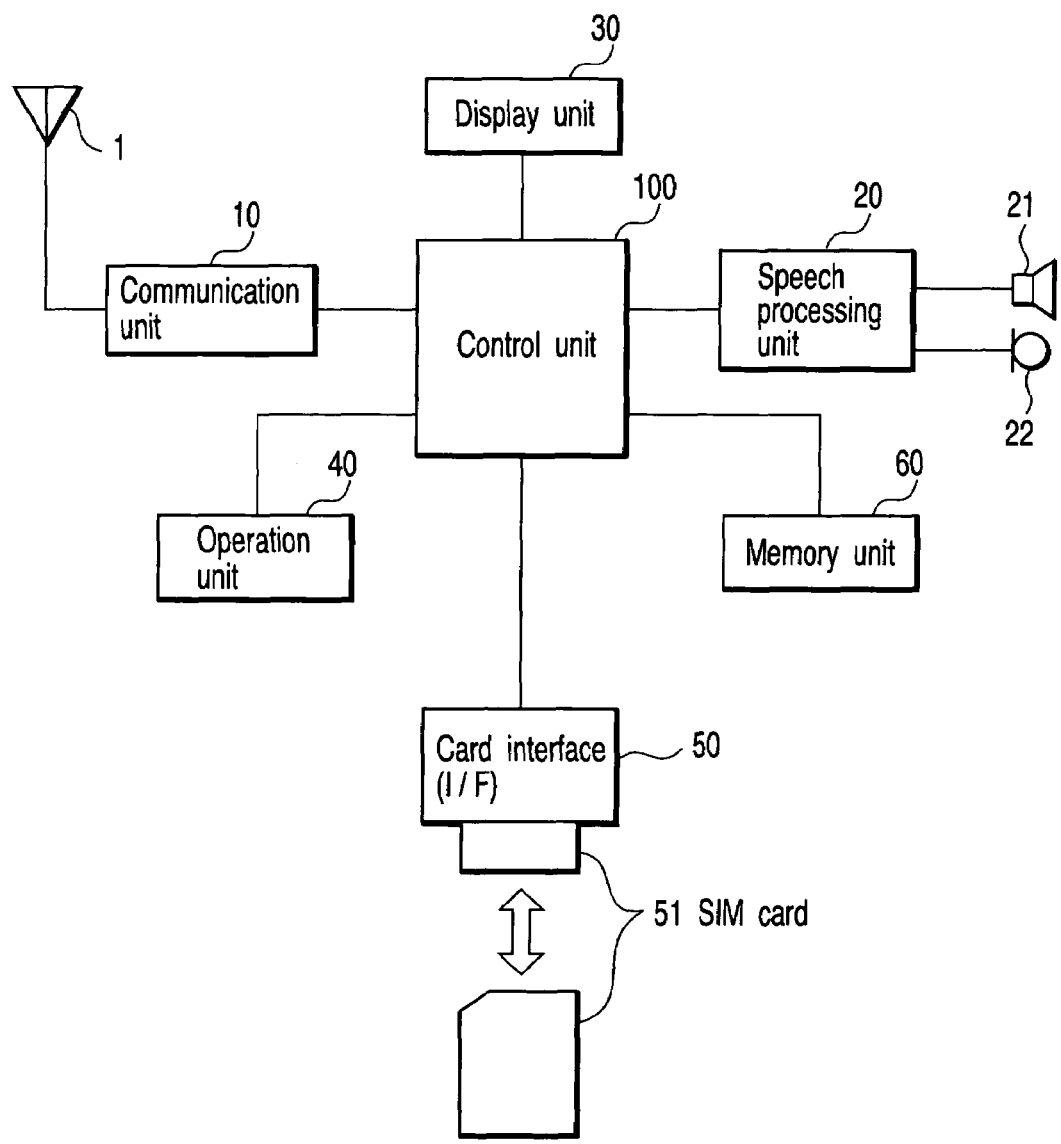
FIG. 1 is a block diagram showing a structure of a mobile radio terminal apparatus according to an embodiment of the present invention.

FIG. 1 shows a structure of a mobile radio terminal apparatus according to the embodiment of the present invention. The mobile radio terminal apparatus comprises an antenna 1, a communication unit 10, a speech processing unit 20, a display unit 30, an operation unit 40, a card interface (I/F) 50, a memory unit 60 and a control unit 100.

The antenna 1 receives a radio signal transmitted from a radio base station (not shown) connected to a network and transmits a radio signal of the mobile radio terminal apparatus to the radio base station.

The communication unit 10 carries out radio communications with the radio base station via the antenna 1 and carries out communications with a communication party via the radio base station and the network. More specifically, the communication unit 10 obtains encoded speech data transmitted from the communication party by downconverting and demodulating the radio signal received by the antenna 1, and outputs the encoded speech data to the speech processing unit 20 via the control unit 100. In addition, the communication unit 10 modulates a baseband signal with encoded speech data supplied from the speech processing unit 20 via the control unit 100, generates a radio signal by upconverting the baseband signal, and transmits the radio signal to the radio base station via the antenna 1.

The speech processing unit 20 reproduces a speech signal by decoding the encoded speech data demodulated by the communication unit 10, and outputs the speech signal from a built-in speaker 21. Conversation speech transmitted from the communication party is thereby transmitted to the user. In addition, the speech processing unit 20 generates encoded speech data by encoding a speech signal input from a built-in microphone 22 and supplies the encoded speech data to the communication unit 10 via the control unit 100.

The display unit 30 is a display device employing a LCD (Liquid Crystal Display) or the like which shows various kinds of visual information such as texts, images and the like to the user. The operation unit 40 comprises a plurality of key switches and the like to accept a user's request.

The card I/F 50 is an interface in which a SIM (Subscriber Identity Module) card 51 is loaded. In accordance with the instruction of the control unit 100, the card I/F 50 accesses the SIM card 51 and exchanges information with the SIM card 51.

The SIM card 51 stores subscriber ID, security codes such as PIN (Personal Identification Number) code and PUK (Personal Unblocking Key) code, telephone book data such as abbreviated dialing numbers, and the like. A CPU built in the card executes predetermined processings in accordance with information transmitted from the outside via the card I/F 50.

The memory unit 60 stores control programs and control data of the control unit 100, telephone book data corresponding to telephone numbers, names and image data such as face pictures.

The control unit 100 controls each of the units in the mobile radio terminal apparatus. For example, the control unit 100 comprises an incoming call control function of controlling the display unit 30 to notify the user of occurrence of the incoming call in a case where the communication unit 10 receives an incoming call signal from the radio base station, and of urging the communication unit 10 to transmit a signal responding to the incoming call and establishing a speech communications link, by user's response operation executed with the operation unit 40.

In addition, the control unit 100 comprises an outgoing call control function of transmitting an outgoing call to a telephone number designated by the user by controlling the communication unit 10, in response to the user's request for outgoing call made with the operation unit 40, and a communications control function of establishing a speech communications link in accordance with the outgoing call.

Moreover, the control unit 100 can make an access to the information of the SIM card 51 via the card I/F 50. However, almost all of information items stored in the SIM card 51 are protected with the security codes. Access to the information in an area protected with the security codes such as the PIN code is permitted only if the code entered by the user is transmitted to the SIM card 51, compared with the security codes in the SIM card 51 by the CPU in the SIM card 51 and thereby authenticated when the power is turned on.

Next, operations of the mobile radio terminal apparatus having the above-explained structure are described. In the following descriptions, operations at the power-on are explained. Explanations on steps of establishing a communications link with a radio base station, control to implement speech communications, and registration, invocation and editing of telephone book data, and the like are omitted.

Figure 2:
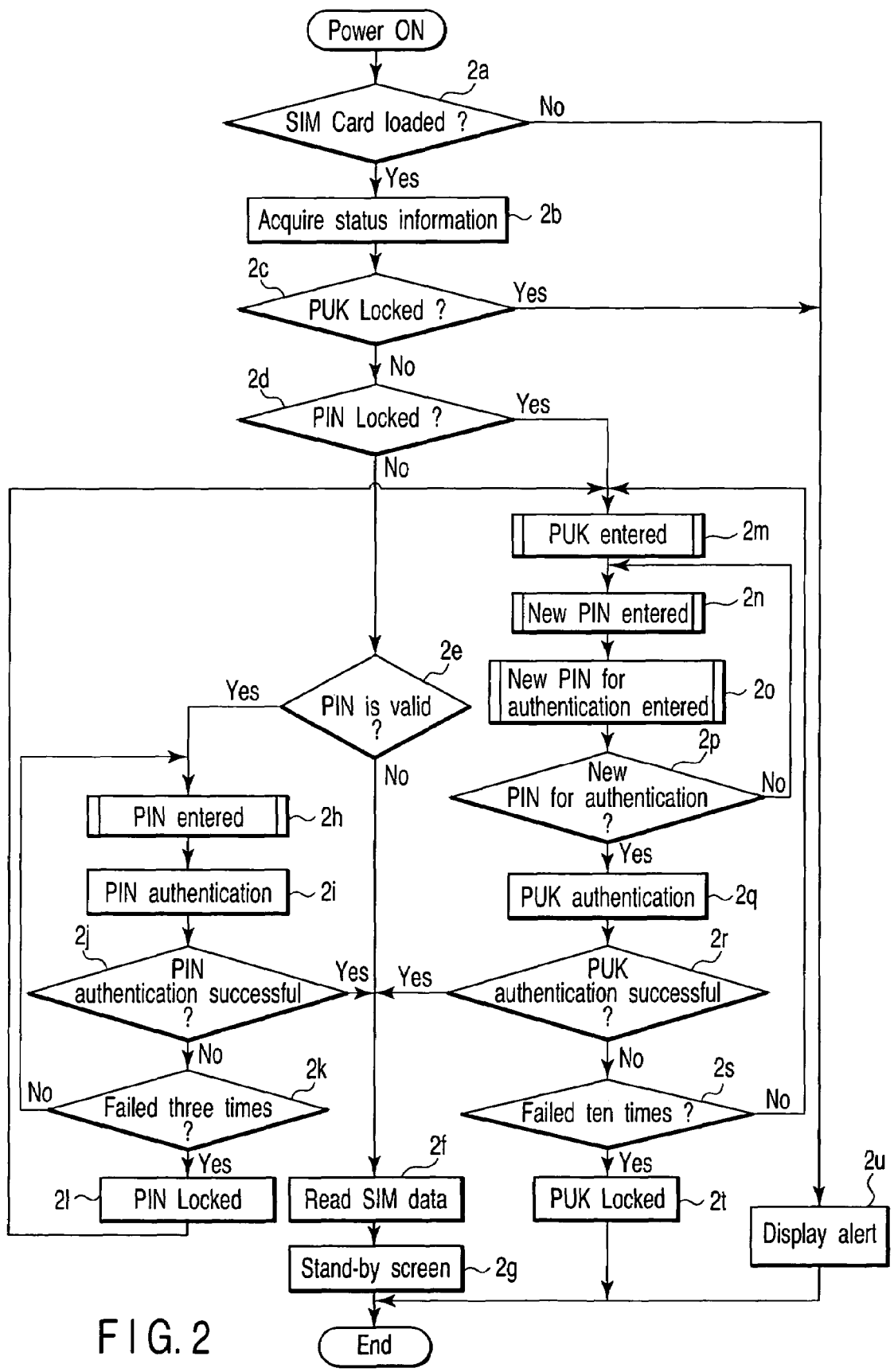
FIG. 2 is a flowchart showing processing started when power is applied to the mobile radio terminal apparatus shown in FIG. 1.

FIG. 2 is a flowchart showing the operations at the power-on. This processing is executed by the control unit 100. A control program to implement the control shown in the flowchart is stored in the memory unit 60. This processing is started when the power is turned on.

First, in step 2a, the control unit 100 controls the card I/F 50 and determines whether or not the SIM card 51 is inserted into the card I/F 50. If the SIM card 51 is inserted into the card I/F 50, the control unit 100 shifts to step 2b. If not, the control unit 100 shifts to step 2u.

In step 2b, the control unit 100 requests status information to the SIM card 51 via the card I/F 50. In the SIM card 51, the built-in CPU checks its own setting status, and transmits information as to whether or not the PUK is locked, information as to whether or not the PIN is set (i.e. whether or not the PIN is valid), and information as to whether or not the PIN is locked, as a status response, to the control unit 100 via the card I/F 50. When the control unit 100 receives the status response, the control unit 100 shifts to step 2c.

In step 2c, the control unit 100 determines whether or not the PUK is locked, on the basis of the status response received in step 2b. If the PUK is locked, the control unit 100 shifts to step 2u. If the PUK is unlocked, the control unit 100 shifts to step 2d.

In step 2d, the control unit 100 determines whether or not the PIN is locked, on the basis of the status response received in step 2b. If the PIN is locked, the control unit 100 shifts to step 2m. If the PIN is unlocked, the control unit 100 shifts to step 2e.

In step 2e, the control unit 100 determines whether or not the PIN is set (i.e. whether or not the PIN is valid), on the basis of the status response received in step 2b. If the PIN is set, the control unit 100 shifts to step 2h. If the PIN is not set, the control unit 100 shifts to step 2f.

In step 2f, the control unit 100 reads identification information such as a subscriber ID from the SIM card 51 via the card I/F 50 and shifts to step 2g.

In step 2g, the control unit 100 reads stand-by image data from the memory unit 60 and controls the display unit 30 to display the stand-by image. In addition, the control unit 100 controls the communication unit 10 to transmit the identification information read in step 2f. The control unit 100 is thereby authenticated by the system and connected to the network. Thus, the mobile radio terminal apparatus becomes capable of making incoming/outgoing calls and ends this processing.

On the other hand, the control unit 100 accepts the entry of the PIN code from the user via the operation unit 40 in step 2h, and shifts to step 2i. The entry processing is executed on the basis of a sub-routine program to be described later.

In step 2i, the control unit 100 transmits the PIN code information entered in step 2e to the SIM card 51 via the card I/F 50 and urges the SIM card 51 to authenticate the PIN code. The CPU of the SIM card 51 determines whether or not the PIN code stored in the SIM card 51 matches the PIN code entered via the card I/F 50.

If both the codes match and the authentication is successfully executed as the determination result, the CPU transmits information indicating that the authentication is successfully executed to the control unit 100 as the authentication result. If the codes do not match and the authentication is failed, the CPU subtracts "1" from remaining number of times of consecutive failures m stored in the SIM card 51 and thereby updates the remaining number of times of consecutive failures m. In the following explanations, it is assumed that initial value of the remaining number of times of consecutive failures m is set at "3", which indicates that failure of PIN authentication is allowed up to three times.

As a result, if the remaining number of times of consecutive failures m is "0", the CPU stores in the SIM card 51 the information indicating the setting to lock the PIN, and transmits information indicating that the PIN authentication is failed and information indicating that the PIN is locked, to the control unit 100 as the authentication result.

If the remaining number of times of consecutive failures m is not "0", the CPU transmits information indicating that the PIN authentication is failed and information indicating the remaining number of times of consecutive failures m, to the control unit 100. When the control unit 100 receives the authentication result from the CPU, the control unit 100 shifts to step 2j.

In step 2j, the control unit 100 determines whether or not the PIN authentication is failed, on the basis of the authentication result received from the CPU of the SIM card 51 in step 2i. If the received authentication result indicates success, the control unit 100 shifts to step 2f. If the received authentication result indicates failure, the control unit 100 shifts to step 2k.

In step 2k, the control unit 100 determines whether or not the PIN authentication is failed three times, on the basis of the authentication result received from the CPU of the SIM card 51 in step 2i. If the control unit 100 receives the information indicating that the PIN is locked in step 2i, the control unit 100 determines that the PIN authentication is failed three times in a row, and shifts to step 2l. If the control unit 100 receives the remaining number of times of consecutive failures m, the control unit 100 determines that the PIN authentication is not still failed three times in a row, and shifts to step 2h.

In step 2l, the control unit 100 controls the display unit 30 to display the information indicating that the PIN is locked, and shifts to step 2m.

In step 2m, the control unit 100 accepts entry of the PUK code from the user via the operation unit 40, and shifts to step 2n. This entry processing is carried out by executing a subroutine program to be described later.

In step 2n, the control unit 100 accepts entry of a newly set PUK code from the user via the operation unit 40, and shifts to step 2o. This entry processing is carried out by executing a subroutine program to be described later.

In step 2o, the control unit 100 accepts entry of the PIN code to authenticate the PIN code accepted in step 2n, from the user via the operation unit 40, and shifts to step 2p. This entry processing is carried out by executing a subroutine program to be described later.

In step 2p, the control unit 100 determines whether or not the PIN code accepted in step 2n matches the PIN code accepted in step 2o. If the codes match, the control unit 100 shifts to step 2q. If the codes do not match, the control unit 100 shifts to step 2n to urge the PIN code to be entered again.

In step 2q, the control unit 100 transmits the information of the PUK code entered in step 2m and the information of the new PIN code entered in step 2n to the SIM card 51 via the card I/F 50 for the purpose of entered PUK code authentication.

The CPU of the SIM card 51 determines whether or not the PUK code stored in the SIM card 51 matches the PUK code entered via the card I/F 50.

If the codes match and the PUK authentication is successfully executed as the determination result, the CPU stores the new PIN code in the SIM card 51, and transmits information indicating that the PUK authentication is successfully executed to the control unit 100 as the authentication result.

If the codes match and the PUK authentication is failed, the CPU updates the remaining number of times of consecutive failures n by subtracting "1" from the remaining number of times of consecutive failures n. In the following descriptions, it is assumed that an initial value of the remaining number of times of consecutive failures n is set at "10", which indicates that failure of PIN authentication is allowed up to ten times.

As a result, if the remaining number of times of consecutive failures n is "0", the CPU stores the information indicating the setting to lock the PUK in the SIM card 51, and transmits information indicating that the PUK authentication is failed and information indicating that the PUK is locked, to the control unit 100 as authentication result.

If the remaining number of times of consecutive failures n is not "0", the CPU transmits information indicating that the PUK authentication is failed and information indicating the remaining number of times of consecutive failures n, to the control unit 100 as authentication result. When the control unit 100 receives the authentication result from the CPU, the control unit 100 shifts to step 2r.

In step 2r, the control unit 100 determines whether or not the PIN authentication is failed, on the basis of the authentication result received from the CPU of the SIM card 51 in step 2q. If the received authentication result indicates success, the control unit 100 shifts to step 2f. If the received authentication result indicates failure, the control unit 100 shifts to step 2s.

In step 2s, the control unit 100 determines whether or not the PUK authentication has been failed ten times, on the basis of the authentication result received from the CPU of the SIM card 51 in step 2q. If the control unit 100 receives the information indicating that the PUK is locked in step 2q, the control unit 100 determines that the PUK authentication has been failed ten times in a row, and shifts to step 2t. If the control unit 100 receives the remaining number of times of consecutive failures n, the control unit 100 determines that the PUK authentication is not still failed ten times in a row, and shifts to step 2m.

In step 2t, the control unit 100 controls the display unit 30 to display the information indicating that the PUK is locked and that access to a network service provider is recommended, and ends the processing.

If the control unit 100 shifts from step 2a to step 2u, the control unit 100 controls the display unit 30 to display an alert indicating that the SIM card 51 is not inserted. If the control unit 100 shifts from step 2c to step 2u, the control unit 100 controls the display unit 30 to display an alert indicating that the PUK is locked. When the alert is displayed, the control unit 100 ends the processing.

Transitions in steps 2c, 2d and 2e, steps 2j and 2k, and steps 2r and 2s are not limited to those in the above-described flows, but may be controlled in any program if the same transition results can be obtained therefrom.

Figure 3:
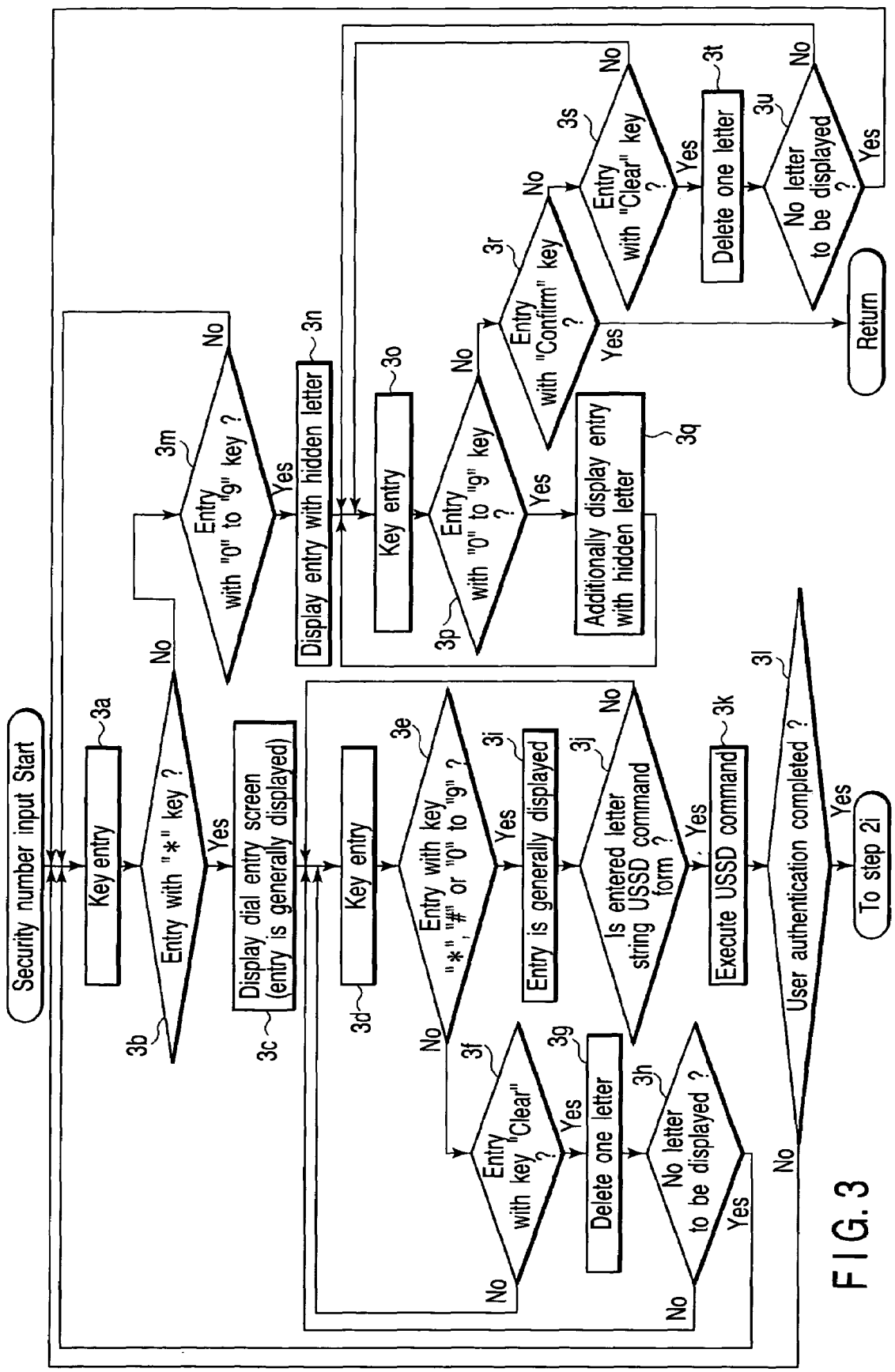
FIG. 3 is a flowchart showing processing executed when a security code such as PIN code of the mobile radio terminal apparatus shown in FIG. 1 is entered.

Next, the entry processing in steps 2h, 2m, 2n and 2o is explained. This processing is executed by the control unit 100, on the basis of the subroutine program stored in the memory unit 60. A flowchart of the entry processing is shown in FIG. 3.

First, in step 3a, the control unit 100 controls the display unit 30 to display a screen which urges a security code to be entered, and accepts key entry of a first letter via the operation unit 40. The control unit 100 shifts to step 3b. The letter data corresponding to the key operated is stored in a buffer of the memory unit 60.

In step 3*b*, the control unit 100 determines whether or not the key operated in step 3*a* is "*" key. If the control unit 100 determines that the "*" key has been operated, the control unit 100 shifts to step 3*c*. If the control unit 100 determines that a key other than the "*" key has been operated, the control unit 100 shifts to step 3*m*. The symbol "*" is entered when a USSD (Unstructured Supplementary Services Data) command is entered.

In step 3*c*, the control unit 100 controls the display unit 30 to start display control for command entry, and shifts to step 3*d*. The letter to be entered is displayed under the display control.

In step 3*d*, the control unit 100 accepts the key entry via the operation unit 40 and shifts to step 3*e*. Letter data items corresponding to the keys operated are sequentially stored in the buffer of the memory unit 60.

In step 3*e*, the control unit 100 determines whether or not the key operated in step 3*d* corresponds to any one of "*", # and "0" to "9". If the control unit 100 determines that the operated key corresponds to any one of "*", # and "0" to "9", the control unit 100 shifts to step 3*i*. If the control unit 100 determines that any key other than "*", # and "0" to "9" has been operated, the control unit 100 shifts to step 3*f*.

In step 3*f*, the control unit 100 determines whether or not the key operated in step 3*d* corresponds to "Clear". If the control unit 100 determines that the key corresponding to "Clear" has been operated, the control unit 100 shifts to step 3*g*. If the control unit 100 determines that any key other than "Clear" has been operated, the control unit 100 shifts to step 3*d* to accept the reentry.

In step 3*g*, the control unit 100 deletes the last item of the letter data items stored in the buffer of the memory unit 60, and shifts to step 3*h*. Since the control unit 100 urges the display unit 30 to display the letters on the basis of the letter data items stored in the buffer of the memory unit 60, the last displayed letter is erased on the display unit 30.

In step 3*h*, the control unit 100 determines whether there is no letter data stored in the buffer of the memory unit 60, i.e. there is no letter to be displayed. If there is no letter to be displayed, the control unit 100 shifts to step 3*a*. If there is a letter to be displayed, i.e. there is letter data stored in the buffer of the memory unit 60, the control unit 100 shifts to step 3*d* to continue accepting the letter entry.

In step 3*i*, the control unit 100 urges the display unit 30 to display the letters on the basis of the letter data items stored in the buffer of the memory unit 60, and shifts to step 3*j*. If "#" is entered, the control unit 100 may assume that entry of the USSD command may be completed and then may shift to step 3*j*. If any one of "*" and "0" to "9" is entered, the control unit 100 may assume that entry of the USSD command may not be completed and then may shift to step 3*d*.

In step 3*j*, the control unit 100 determines whether or not the letter string formed of the letter data items stored in the buffer of the memory unit 60 is in a USSD command form. If the control unit 100 determines that the letter string is in a USSD command form, the control unit 100 shifts to step 3*k*. If the control unit 100 determines that the letter string is not in a USSD command form, the control unit 100 shifts to step 3*d*.

In step 3*k*, the control unit 100 executes the USSD command corresponding to the letter string formed of the letter data items stored in the buffer of the memory unit 60, and shifts to step 3*l*.

In step 3*l*, the control unit 100 determines whether or not the user authentication has been completed, by executing the USSD command in step 3*k*. If the control unit 100 determines that the user authentication has been completed, the control unit 100 shifts to step 2*i*. If the control unit 100 determines that the user authentication has not been completed, the control unit 100 shifts to step 3*a*.

In step 3*m*, the control unit 100 determines whether or not the key operated in step 3*b* is a key corresponding to any one of "0" to "9". If the control unit 100 determines that the key corresponding to any one of "0" to "9" has been operated, the control unit 100 shifts to step 3*n*. If the control unit 100 determines that any key other than keys corresponding to "0" to "9" has been operated, the control unit 100 shifts to step 3*a*.

In step 3*n*, the control unit 100 controls the display unit 30 and changes the display to a screen to enter the security code. The control unit 100 shifts to step 3*o*. Under the display control, since the entered letters are displayed with the symbol such as "*", the entered content is hidden.

In step 3*o*, the control unit 100 accepts the key entry via the operation unit 40, and shifts to step 3*p*. The letter data item corresponding to the key operated is stored in the buffer of the memory unit 60.

In step 3*p*, the control unit 100 determines whether or not the key operated in step 3*o* corresponds to any one of "0" to "9". If the control unit 100 determines that the key corresponding to any one of "0" to "9" has been operated, the control unit 100 shifts to step 3*q*. If the control unit 100 determines that any key other than the keys of "0" to "9" has been operated, the control unit 100 shifts to step 3*r*.

The control unit 100 urges the display unit 30 to display symbols such as "*" by the number of the letter data items stored in the buffer of the memory unit 60 in step 3*q*, and shifts to step 3*o*.

In step 3*r*, the control unit 100 determines whether or not the key operated in step 3*o* is a key corresponding to "Confirm". If the control unit 100 determines that the key corresponding to "Confirm" has been operated, the control unit 100 ends this processing and returns to the previous processing in the flow of FIG. 2. If the control unit 100 determines that any key other than the key corresponding to "Confirm" has been operated, the control unit 100 shifts to step 3*s*.

In step 3*s*, the control unit 100 determines whether or not the key operated in step 3*o* is a key corresponding to "Clear". If the control unit 100 determines that the key corresponding to "Clear" has been operated, the control unit 100 shifts to step 3*t*. If the control unit 100 determines that any key other than the key corresponding to "Clear" has been operated, the control unit 100 shifts to step 3*o* and accepts reentry.

In step 3*t*, the control unit 100 deletes the last item of the letter data items stored in the buffer of the memory unit 60, and shifts to step 3*u*. Since the control unit 100 urges the display unit 30 to display the letters on the basis of the letter data items stored in the buffer of the memory unit 60, the last displayed letter is erased on the display unit 30.

In step 3*u*, the control unit 100 determines whether there is no letter data stored in the buffer of the memory unit 60, i.e. there is no letter to be displayed. If there is no letter to be displayed, the control unit 100 shifts to step 3*a*. If there is a letter to be displayed, i.e. there is a letter data item stored in the buffer of the memory unit 60, the control unit 100 shifts to step 3*o* to continue accepting the letter entry.

Next, the processings shown in FIG. 2 and FIG. 3 will be explained with display examples of the display unit 30 in FIG. 4 to FIG. 10.

Figure 4:
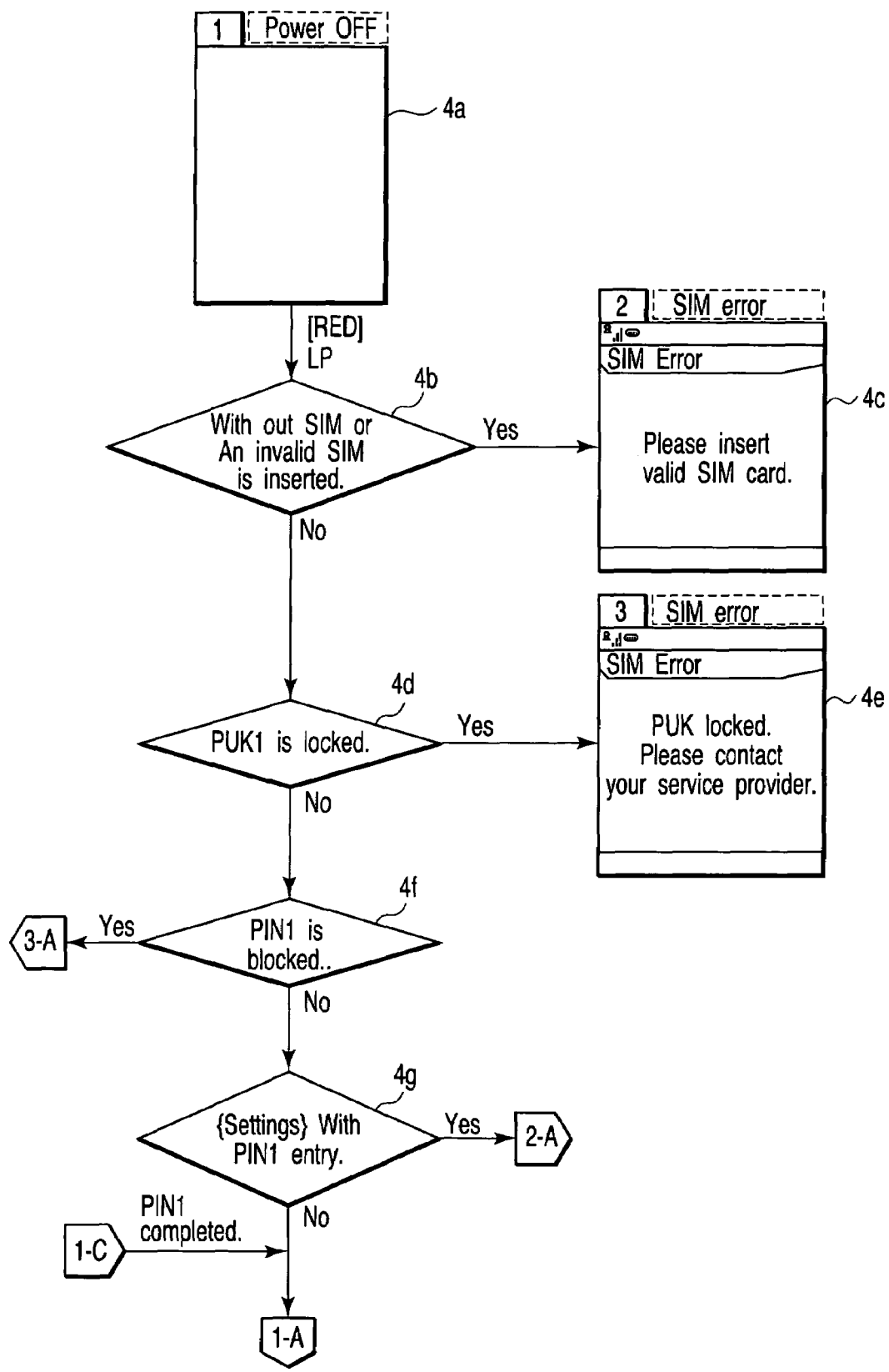
FIG. 4 is a block diagram showing a structure of a conventional mobile radio terminal apparatus.

First, as shown in FIG. 4, when the power is turned off, the display unit 30 displays no item in step 4a.

If a RED key (power key) of the operating unit is pushed for a long time (as represented by LP in the drawing), the control unit 100 determines whether a SIM card 51 is not inserted or an unauthorized SIM card 51 is inserted into the card I/F 50 in step 4b.

If a SIM card 51 is not inserted or an unauthorized SIM card 51 is inserted into the card I/F 50, the control unit 100 urges the display unit 30 to display a screen indicating that an authorized SIM card 51 needs to be inserted into the card I/F 50 as illustrated in step 4c and ends this processing. If an authorized SIM card 51 is inserted into the card I/F 50, the control unit 100 shifts to step 4d.

In step 4d, the control unit 100 makes access to the SIM card 51 through the card I/F 50 and acquires status information from the SIM card 51. As a result, if the control unit 100 acquires information indicating that the PUK is locked, the control unit 100 urges the display unit 30 to display a screen indicating that the PUK is locked as illustrated in step 4e and ends this processing. If the control unit 100 receives information indicating that the PUK is unlocked, the control unit 100 shifts to step 4f.

In step 4f, the control unit 100 determines whether or not the PIN is locked, by referring to the status information acquired in step 4d. If the PIN is locked, the control unit 100 shifts to step 7a (3-A). If the PIN is unlocked, the control unit 100 shifts to step 4g.

In step 4g, the control unit 100 determines whether or not the PIN is valid, by referring to the status information acquired in step 4d. If the PIN is valid, the control unit 100 shifts to step 6a (2-A). If the PIN is invalid, the control unit 100 shifts to step 5a (1-A).

Figure 5:
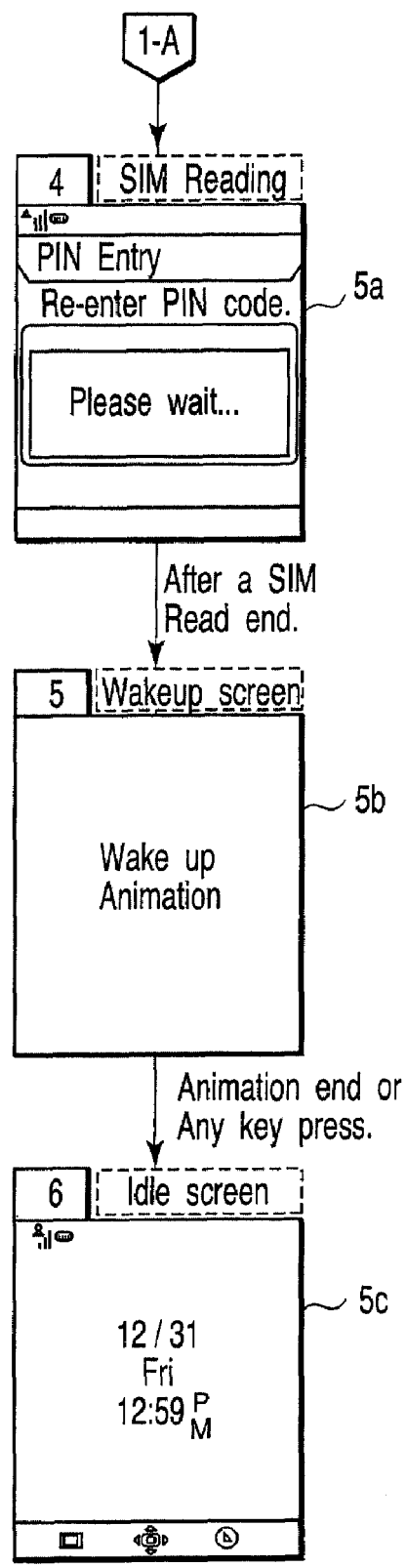
FIG. 5 is a flowchart showing operations of the mobile radio terminal apparatus shown in FIG. 1 together with transition of a display screen.

As illustrated in FIG. 5, the control unit 100 reads identification information such as subscriber ID and the like from the SIM card 51 through the card I/F 50, and urges the display unit 30 to display a screen indicating that the control unit 100 is reading the identification information, in step 5a. When the control unit 100 ends reading the control unit 100 shifts to step 5b.

In step 5b, the control unit 100 reads data of a wakeup screen (animation) from the memory unit 60 and controls the display unit 30 to display the animation screen. When the display of the animation screen is ended or the user operates the operation unit 40, the control unit 100 shifts to step 5c.

In step 5c, the control unit 100 reads the data of a standby screen from the memory unit 60 and urges the display unit 30 to display the standby screen. After that, the control unit 100 controls the communication unit 10 to transmit the identification information read in step 5a, accept authentication from the system and connect to the network. The mobile radio terminal apparatus thereby becomes capable of making incoming/outgoing calls.

Figure 6:
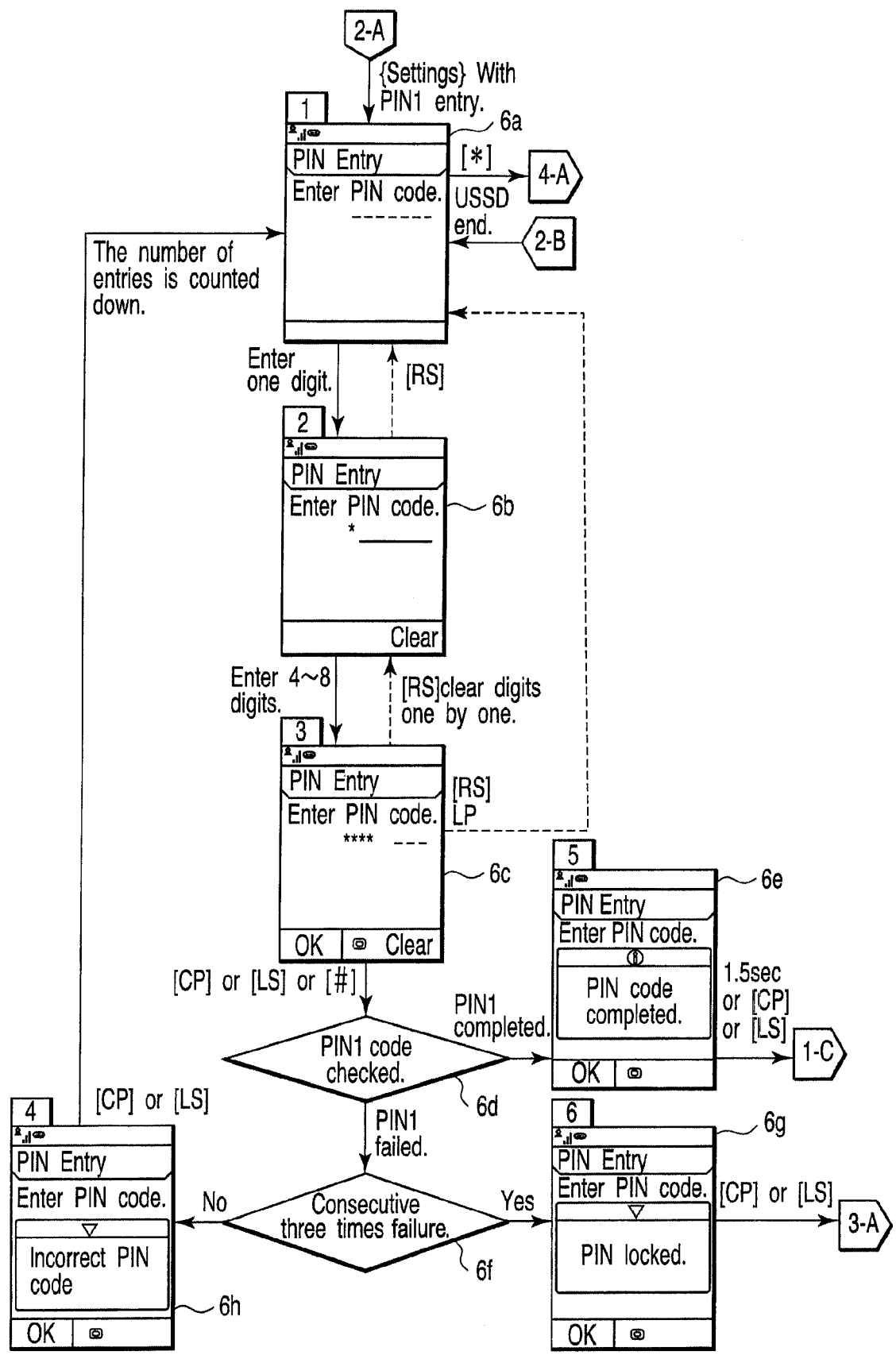
FIG. 6 is a flowchart showing operations of the mobile radio terminal apparatus shown in FIG. 1 together with transition of a display screen.

As shown in FIG. 6, the control unit 100 urges the display unit 30 to display a screen indicating standby of the PIN code entry and accepts key entry through the operation unit 40. If a key corresponding to "*" is operated, the control unit 100 shifts to step 9a (4-A). If a key corresponding to any one of "0" to "9" is operated, the control unit 100 stores the letter data corresponding to the operated key in the buffer of the memory unit 60 and shifts to step 6b.

In step 6b, after urging the display unit 30 to display "*" for one letter, the control unit 100 accepts entries of 4 to 8 digits corresponding to the second and following letters through the operation unit 40 in step 6b. The control unit 100 shifts to step 6c. If the right shift key (RS) is operated in step 6b, the control unit 100 deletes the letter data accepted in step 6a in the buffer of the memory unit 60 and also erases "*" in the display.

In step 6c, the control unit 100 urges the display unit 30 to display "*" by the number of letter data items stored in the buffer of the memory unit 60. If the right shift key (RS) is operated, the control unit 100 deletes the letter data items stored in the buffer of the memory unit 60 by the number of times of operating the right shift key (RS) and also erases "*" by the number of times of the operations.

If the right shift key (RS) is pushed for a long time, the control unit 100 deletes all of the letter data items stored in the buffer of the memory unit 60 and also erases all of "*" in the display. If any one of center key (CP), left shift key (LS) and "#" key of the operation unit 40 is operated, the control unit 100 shifts to step 6d.

In step 6d, the control unit 100 transmits the PIN code in steps 6a to 6c to the SIM card 51 through the card I/F 50 and urges the SIM card 51 to authenticate the PIN code. The control unit 100 acquires the authentication result through the card I/F 50. If the authentication result indicates success in authentication, control unit 100 shifts to step 6e. If the authentication result indicates failure in authentication, control unit 100 shifts to step 6f.

In step 6e, the control unit 100 urges the display unit 30 to display a screen indicating the success in PIN authentication. If one and half seconds elapse or the center key (CP) or left shift key (LS) of the operation unit 40 is operated, the control unit 100 shifts to step 5a (1-C).

In step 6f, the control unit 100 determines whether or not the PIN authentication has been failed three times, on the basis of the authentication result received from the SIM card 51 in step 6d. If the control unit 100 receives the information indicating that the PIN is locked in step 6d, the control unit 100 determines that the PIN authentication has been failed three times and shifts to step 6g. If the control unit 100 receives the remaining number of times of consecutive failures m, the control unit 100 determines that the PIN authentication is not still failed three times in a row and shifts to step 6h.

In step 6g, the control unit 100 urges the display unit 30 to display a screen indicating that the PIN is locked. After that, if the center key (CP) or left shift key (LS) of the operation unit 40 is operated, the control unit 100 shifts to step 7a (3-A).

In step 6h, the control unit 100 urges the display unit 30 to display a screen indicating that the entered security code is incorrect. After that, if the center key (CP) or left shift key (LS) of the operation unit 40 is operated, the control unit 100 shifts to step 6a.

Figure 7:
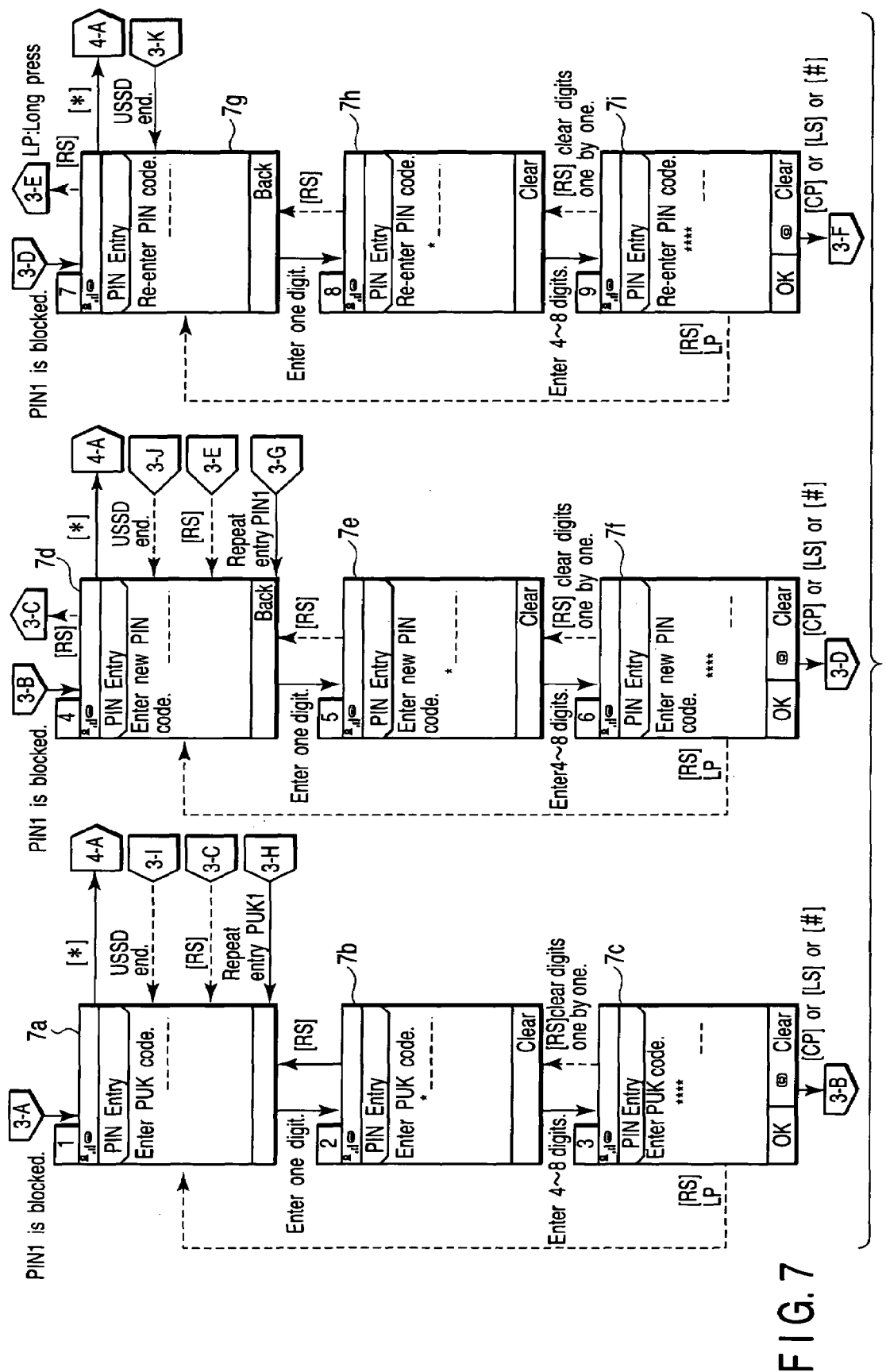
FIG. 7 is a flowchart showing operations of the mobile radio terminal apparatus shown in FIG. 1 together with transition of a display screen.

As shown in FIG. 7, the control unit 100 urges the display unit 30 to display a screen indicating that the PUK code needs to be entered and accepts key entry through the operation unit 40, in step 7a. If the key corresponding to "*" is operated, the control unit 100 stores "*" in the buffer of the memory unit 60 and shifts to step 9a (4-A).

If the key corresponding to any one of "0" to "9" is operated, the control unit 100 stores the letter corresponding to the operated key in the buffer of the memory unit 60 and shifts to step 7b. In step 7b, the control unit 100 urges the display unit 30 to display the letter entered in step 7a with a symbol such as "*" or the like, such that the entered content is hidden.

The control unit 100 accepts entry of totally four to eight letters through the operation unit 40, stores letters corresponding to the operated keys in the buffer of the memory unit 60 and shifts to step 7*c*.

In step 7*c*, the control unit 100 urges the display unit 30 to display the letters further entered in step 7*b* with symbols such as "*" and the like, such that the entered contents are hidden. After that, if the center key (CP), left shift key (LS) or "#" key of the operation unit 40 is operated, the control unit 100 shifts to step 7*d* (3-B).

In step 7*d*, the control unit 100 urges the display unit 30 to display a screen indicating that a PIN code to be newly set needs to be entered and accepts key entry through the operation unit 40. If a key corresponding to "*" is operated, the control unit 100 stores "*" in the buffer of the memory unit 60 and shifts to step 9*a* (4-A), after clearing the buffer.

If the key corresponding to any one of "0" to "9" is operated, the control unit 100 stores the letter corresponding to the operated key in the buffer of the memory unit 60 and shifts to step 7*e*. In step 7*e*, the control unit 100 urges the display unit 30 to display the letter entered in step 7*d* with a symbol such as "*", such that the entered content is hidden.

The control unit 100 accepts entry of totally four to eight letters through the operation unit 40, stores letters corresponding to the operated keys in the buffer of the memory unit 60 and shifts to step 7*f*.

In step 7*f*, the control unit 100 further urges the display unit 30 to display the letters entered in step 7*e* with symbols such as "*" and the like, such that the entered contents are hidden. After that, if the center key (CP), left shift key (LS) or "#" key of the operation unit 40 is operated, the control unit 100 shifts to step 7*g* (3-D).

In step 7*g*, the control unit 100 urges the display unit 30 to display a screen indicating that the PIN code needs to be entered, to confirm the PIN code accepted in steps 7*d* to 7*f*, and accepts key entry through the operation unit 40. If a key corresponding to "*" is operated, the control unit 100 stores "*" in the buffer of the memory unit 60 and shifts to step 9*a* (4-A), after clearing the buffer.

If the key corresponding to any one of "0" to "9" is operated, the control unit 100 stores the letter corresponding to the operated key in the buffer of the memory unit 60 and shifts to step 7*h*. In step 7*h*, the control unit 100 urges the display unit 30 to display the letter entered in step 7*g* with a symbol such as "*", such that the entered content is hidden.

The control unit 100 accepts entry of totally four to eight letters through the operation unit 40, stores letters corresponding to the operated keys in the buffer of the memory unit 60 and shifts to step 7*i*.

In step 7*i*, the control unit 100 urges the display unit 30 to display the letters further entered in step 7*h* with symbols such as "*" and the like, such that the entered contents are hidden. After that, if the center key (CP), left shift key (LS) or "#" key of the operation unit 40 is operated, the control unit 100 shifts to step 8*a* (3-F).

Figure 8:
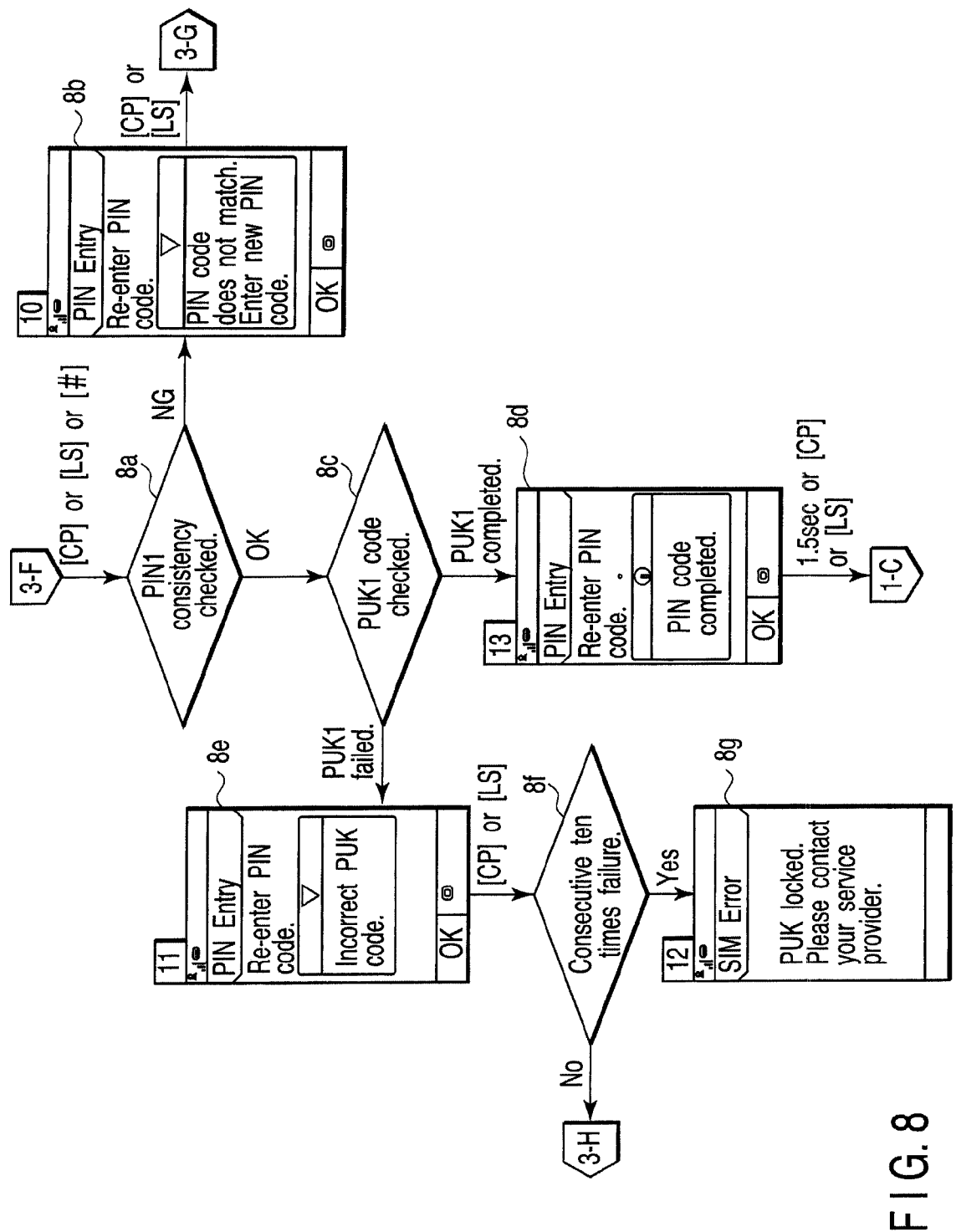
FIG. 8 is a flowchart showing operations of the mobile radio terminal apparatus shown in FIG. 1 together with transition of a display screen.

As shown in FIG. 8, the control unit 100 determines whether or not the PIN code accepted in steps 7*d* to 7*f* and the PIN code accepted in steps 7*g* to 7*i* both stored in the buffer of the memory unit 60 match each other, in step 8*a*. If both codes match, the control unit 100 shifts to step 8*c*. If the codes do not match, the control unit 100 shifts to step 8*b*.

In step 8*b*, the control unit 100 urges the display unit 30 to display a screen indicating that the PIN codes do not match. If the center key (CP) or left shift key (LS) of the operation unit 40 is operated, the control unit 100 shifts to step 7*d* (3-G), for reentry of PIN code.

In step 8*c*, the control unit 100 transmits the PUK code stored in the buffer of the memory unit 60 and accepted in steps 7*a* to 7*c*, and a new PIN code, to the SIM card 51 through the card I/F 50, to urge the SIM card 51 to authenticate the PUK code. The control unit 100 acquires the authentication result through the card I/F 50. If the authentication result indicates success in authentication, the control unit 100 shifts to step 8*d*. If the authentication information indicates failure in authentication, the control unit 100 shifts to step 8*e*.

In step 8*d*, the control unit 100 controls the display unit 30 to display a screen indicating that setting a new PIN code is completed. If one and half seconds elapse or the center key (CP) or left shift key (LS) of the operation unit 40 is operated, the control unit 100 shifts to step 5*a* (1-C).

In step 8*e*, the control unit 100 controls the display unit 30 to display a screen indicating that the entered PUK code is incorrect. If the center key (CP) or left shift key (LS) of the operation unit 40 is operated, the control unit 100 shifts to step 8*f*.

In step 8*f*, the control unit 100 determines whether or not the PUK authentication has been failed ten times, on the basis of the authentication result received from the SIM card 51 in step 8*c*. If the control unit 100 receives information indicating that the PUK is locked, in step 8*c*, the control unit 100 determines that the PUK authentication has been failed ten times in a row and shifts to step 8*g*. If the control unit 100 receives the remaining number of times of consecutive failures n, the control unit 100 determines that the PUK authentication is not still failed ten times in a row and shifts to step 7*a* (3-H) to accept reentry of the PUK code.

In step 8*g*, the control unit 100 controls the display unit 30 to display an alert indicating that the PUK is locked, and ends this processing.

Figure 9:
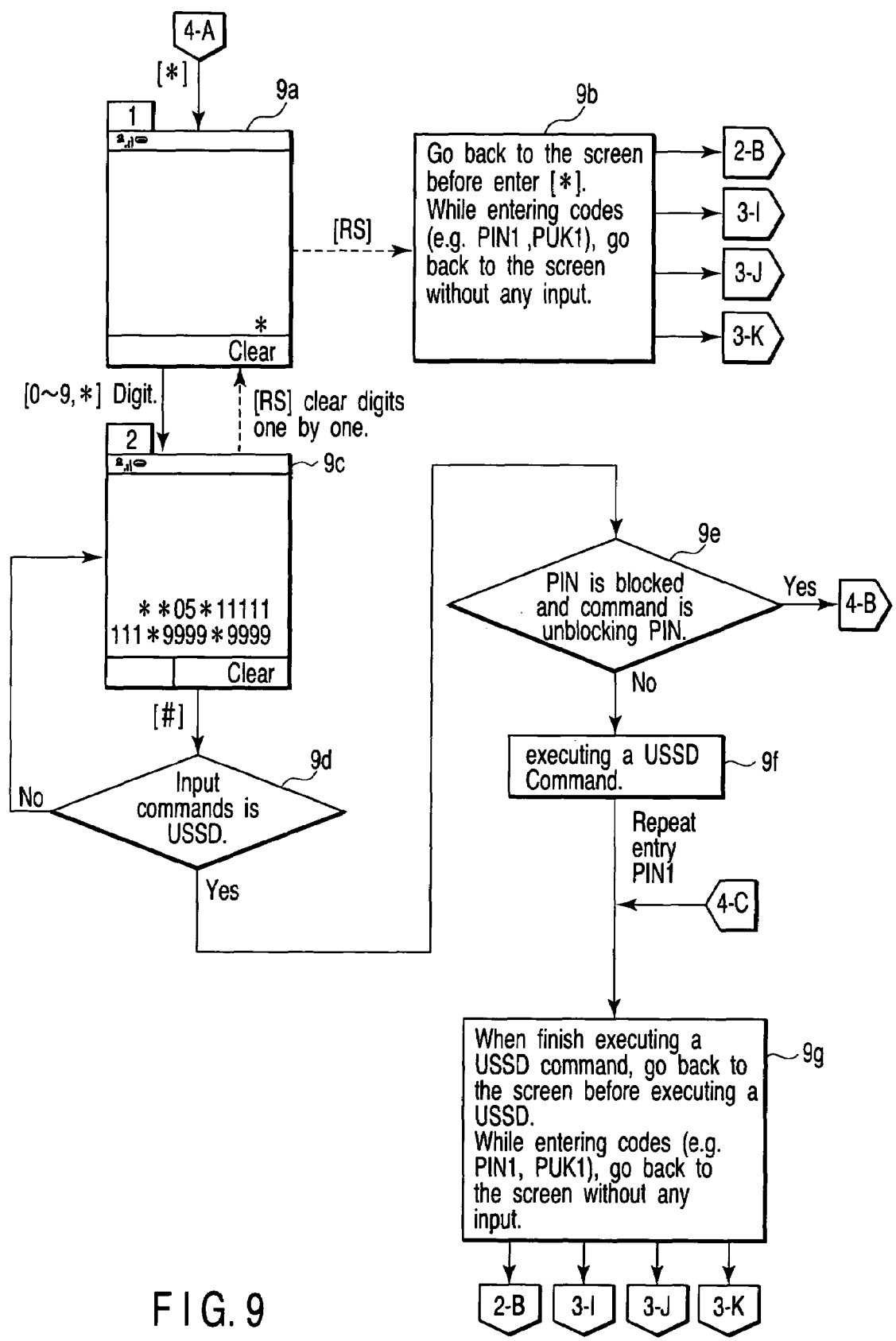
FIG. 9 is a flowchart showing operations of the mobile radio terminal apparatus shown in FIG. 1 together with transition of a display screen.

As shown in FIG. 9, the control unit 100 urges the display unit 30 to display symbol "*" entered in the dial entry screen, in step 9*a*. If the right shift key (RS) of the operation unit 40 is operated, the control unit 100 shifts to step 9*b*. If the key corresponding to any one of "*" and "0" to "9" in the operation unit 40 is operated, the control unit 100 shifts to step 9*c*. If the key corresponding to "#" in the operation unit 40 is operated, the control unit 100 shifts to step 9*d*.

In step 9*b*, the control unit 100 urges the display unit 30 to display a screen indicating return to a screen displayed prior to entry of "*", and returns to the screen displayed prior to entry of "*" (2-B, 3-I, 3-J or 3-K).

In step 9*c*, the control unit 100 stores entered letters in the buffer of the memory unit 60 and urges the display unit 30 to display the stored letters. If the key corresponding to "#" in the operation unit 40 is operated, the control unit 100 shifts to step 9*d*. If the right shift key (RS) of the operation unit 40 is operated, the control unit 100 deletes the letter data items stored in the buffer of the memory unit 60, by the number of times of operating the right shift key (RS) and shifts to step 9*a*. If the key corresponding to any one of "*" and "0" to "9" in the operation unit 40 is operated, the control unit 100 stores the letter data item of the corresponding key in the buffer of the memory unit 60, and stands by next letter entry.

In step 9*d*, the control unit 100 determines whether or not the letter string formed of the letter data items stored in the buffer of the memory unit 60 is in a USSD command form. If the control unit 100 determines that the letter string is in a USSD command form, the control unit 100 shifts to step 9*e*. If the control unit 100 determines that the letter string is not in a USSD command form, the control unit 100 shifts to step 9*c*.

In step 9e, the control unit 100 acquires information indicating whether or not the PIN is locked, from the SIM card 51 through the card I/F 50, determines whether or not the PIN is locked, and determines whether or not the USSD command entered in steps 9a and 9b is a command to unlock the PIN.

If the PIN is locked and the USSD command is a command to unlock the PIN, the control unit 100 shifts to step 10a (4-B). If not, the control unit 100 shifts to step 9f.

In step 9f, the control unit 100 executes the USSD command and shifts to step 9g. When the control unit 100 ends executing the USSD command in step 9g, the control unit 100 returns the screen of the display unit 30 to the state displayed prior to executing the USSD command (2-B, 3-I, 3-J or 3-K).

Figure 10:
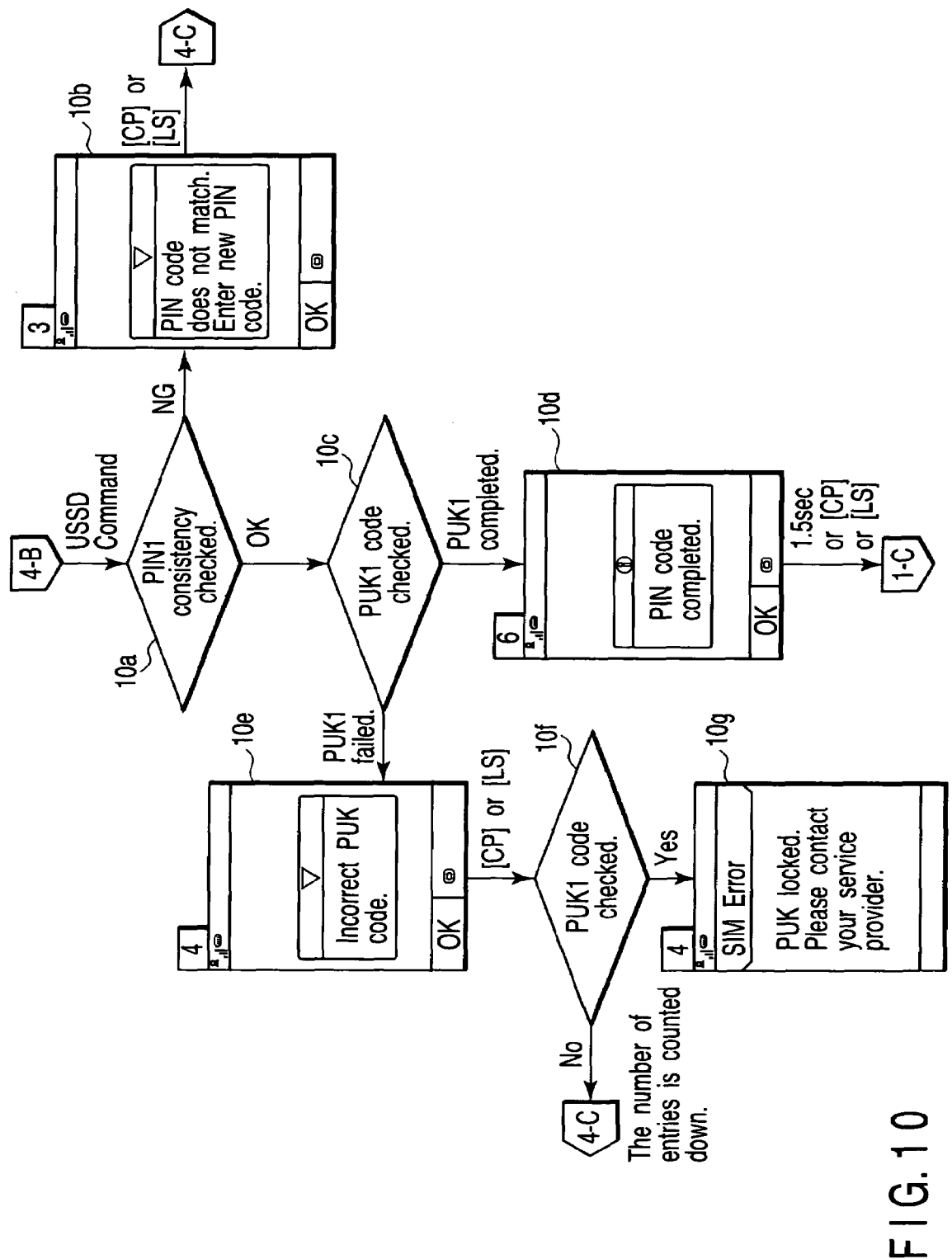
FIG. 10 is a flowchart showing operations of the mobile radio terminal apparatus shown in FIG. 1 together with transition of a display screen.

As shown in FIG. 10, the control unit 100 determines whether or not the PIN code accepted in steps 7d to 7f and the PIN code accepted in steps 7g to 7i both stored in the buffer of the memory unit 60 match each other, in step 10a. If the codes match, the control unit 100 shifts to step 10c. If the codes do not match, the control unit 100 shifts to step 10b.

In step 10b, the control unit 100 urges the display unit 30 to display a screen indicating that the PIN codes do not match. If the center key (CP) or left shift key (LS) of the operation unit 40 is operated, the control unit 100 shifts to step 9g (4-C), for reentry of the PIN code.

In step 10c, the control unit 100 transmits the PUK code accepted in steps 7a to 7c and the new PIN code accepted in steps 7e to 7g both stored in the buffer of the memory unit 60, to the SIM card 51 through the card I/F 50, to urge the SIM card 51 to authenticate the PUK code. The control unit 100 acquires the authentication result through the card I/F 50. If the authentication result indicates success in authentication, control unit 100 shifts to step 10d. If the authentication result indicates failure in authentication, control unit 100 shifts to step 11e.

In step 10d, the control unit 100 controls the display unit 30 to display a screen indicating that setting the new PIN code has been completed. If one and half seconds elapse or the center key (CP) or left shift key (LS) of the operation unit 40 is operated, the control unit 100 shifts to step 5a (1-C).

In step 10e, the control unit 100 controls the display unit 30 to display a screen indicating that the entered PUK code is incorrect. If one and half seconds elapse or the center key (CP) or left shift key (LS) of the operation unit 40 is operated, the control unit 100 shifts to step 10f.

In step 10f, the control unit 100 determines whether or not the PUK authentication has been failed ten times, on the basis of the authentication result received from the SIM card 51, in step 10c. If the control unit 100 receives the information indicating that the PUK is locked in step 10c, the control unit 100 determines that the PUK authentication has been failed ten times in a row, and shifts to step 10g. If the control unit 100 receives the remaining number of times of consecutive failures n, the control unit 100 determines that the PUK authentication is not still failed ten times in a row, and shifts to step 9g (4-C).

In step 10g, the control unit 100 controls the display unit 30 to display an alert indicating that the PUK is locked, and ends the processing.

In the mobile radio terminal apparatus having the above-described structure, when the security code is entered, the entered letters are displayed as hidden letters. However, if specific symbol "*" which is not used at the entry of the security code (but used at the entry of the USSD command) is entered, it is determined that the USSD command is entered and the entered letters are displayed such that the user can read them.

Therefore, the mobile radio terminal apparatus has much convenience that if the USSD command is accepted in the state of accepting the entry of the security information, the user can visually recognize it.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments.

For example, an outgoing call cannot be made under a condition that the security code needs to be entered, in the above-described embodiment. However, if the control unit 100 accepts a request for outgoing call without entry of the security code, the control unit 100 may make an outgoing call to preset emergency telephone numbers of police stations, fire departments and the like by controlling the communication unit 10 and the speech processing unit 20.

In addition, the above-described embodiment is configured to carry out only speech communications. However, the present invention can also be applied to a mobile radio terminal apparatus capable of speech and video communications (videophone) and data communications such as web browsing, mail transmission and reception and the like.

In the above-described embodiment, entry of the security code at the power-up is explained. However, the present invention can also be applied to a case of entering the security code during the data communications such as web browsing and the like.

Moreover, the entered security code is displayed as the hidden letters in the above-described embodiment. Instead of this, however, for example, the hidden letters may not be displayed. In addition, the used hidden letters are displayed with a uniform font even if a plurality of letters are entered. However, a plurality of entered letters may be displayed as different hidden letters or random letters.

Needless to say, the present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal apparatus comprising:
a display unit which displays at least text information;
an entry unit which accepts entry of a letter;
a security code information processing unit which prompts a user to input a security code and which enables or disables operation functions of the mobile radio terminal apparatus depending on the input security code; and
a display control unit which, when the input of the security code information is prompted, controls the display unit to:

(a) display a letter which is different from the letter accepted by the entry unit, if the letter accepted by the entry unit corresponds to a numeric key; and (b) display a first predetermined letter, corresponding to a non-numeric key, and a second letter subsequently accepted by the entry unit, if the first predetermined letter is entered and the second letter corresponding to a numeric key or a non-numeric key is subsequently entered.

2. The apparatus according to claim 1, further comprising a communications control unit which if the security code is accepted, transmits the entered security code to a storage medium that stores a predetermined security code, and connects to a network after the entered security code and the predetermined security code stored in the storage medium are successfully authenticated.

3. The apparatus according to claim 1, further comprising an execution control unit which executes a predetermined command if a third letter is entered after the second letter, and if a string formed by the third letter, the second letter and the first predetermined letter coincides with the predetermined command.

4. The apparatus according to claim 3, wherein the predetermined command is a USSD command.

* * * * *